Patented Oct. 12, 1954

2,691,592

UNITED STATES PATENT OFFICE 2,691,592

MALTED PRODUCT AND METHOD OF PREPARING SAME

Francis Frederick Hansen, Pittsburgh, Pa.

No Drawing. Continuation of application Serial No. 647,211, February 12, 1946. This application December 1, 1950, Serial No. 198,749

10 Claims. (Cl. 99—91)

This invention relates to malted grain flour. More particularly the invention relates to a flour made from grain which is highly malted, and then has its proteolytic and diastatic enzyme content destroyed, and its protein and starch content modified to act as a nutrient or culture for yeast development in the dough of a yeast-mixed bread.

This application is a continuation of my application Serial No. 647,211, filed February 12, 1946, now abandoned, for a Malted Product and Method of Preparing the Same.

In general, my invention contemplates sprouting the grain considerably beyond the point which is at present deemed to be the optimum, whereby the conversion by enzymic action of the nutrients starch and protein of the cereal into water soluble substances is more advanced than with present practice; and then, instead of arresting the enzymic activity of the grain, and converting it into flour, its proteolytic and diastatic enzymic properties are completely destroyed. Whereas, therefore, the normal malt, when reduced to flour and incorporated into dough, and being in a warm, moist environment, is capable of again becoming active, and hence exerting a diastatic and proteolytic enzymic action on the flour of the dough into which it is mixed, the material of my invention has all life qualities destroyed, and though itself inert, it is by reason of the extended conversion of the nutrient ingredients to a soluble state, a fertile culture medium for yeast growth. The fundamental purpose of the two types of malt in the dough is thus different, the normal malt serving to provide added enzymic action, whereas the material of the present application is a super malted completely devitalized substance in which the enzymic properties, instead of being arrested, are destroyed.

My invention is best understood by some reference to the present methods of preparing and using malts.

In former times, the grain, after being cut, was shocked and heaped in the field where the ripened seeds were exposed to the elements. The action of the sunlight, rain and dew tended to stimulate the life producing properties in the seeds. As a matter of fact, in unfavorable weather grain was sometimes lost by sprouting, due to the life processes having progressed to an undesirable extent. At the present time wheat is harvested largely by combines, so that the grain is cut, threshed, bagged, and put under cover before there has been any enzymic action due to weather effects at all. Consequently it is well known at the present time that satisfactory finished baked goods cannot be made from freshly milled flour. In such freshly milled flour the diastatic and proteolytic enzymes are too inactive and inert, and there has been too little conversion of any of the nutrients of the seed into a soluble substance for the flour to be satisfactory. Therefore, in baking practice it has been established that at the mill these flours can be improved in their baking characteristics by adding some malted wheat flour. The amounts added depend upon their varying diastatic values, as determined by chemical tests. For practical purposes, from about one-eighth per cent to one-fourth per cent of malted wheat flour is added to most bakery flours which are milled into bread-making flours. Especially is this true where the flours are derived from what are termed "winter wheats," that is, wheats planted in the fall and harvested the following early summer, as in contrast to wheats planted in the early spring and harvested in the middle or late summer of the same year. Flours milled from these latter wheats are called "spring flours." Often malted wheat flours are added to raise their diastatic levels. Naturally, in raising the diastatic levels, the proteolytic levels are also raised, since malted wheat flours also run much higher in proteolytic activity than the so-called regular or normal ungerminated wheat flours. It is a proven and accepted fact that such practice of adding malted wheat flour to regular flours improves their desirable baking characteristics in several ways.

In addition to active proteolytic and diastatic enzymes normally occurring in so-called regular flours, there occur in these malts the following enzymes—peptase enzymes, which convert proteins into a simpler and more soluble albumoses, peptones and amides. The enzymes of invertose and maltose also are present. Cellulose-dissolving enzymes also are present, such as cytase and cellulose. These enzymes attack and destroy the cellulose cell walls which surround or envelop each starch granule of the flour.

In the usual practice of manufacturing malted wheat flour, the wheat is cleaned and scoured to remove sand and soil often occurring in wheat. Foreign grain seeds and weed seeds are removed by air separation and other mechanical means. After the wheat is cleaned, it is steeped or moistened with water at a temperature of approximately 80° F. The moisture content is increased from about 15 per cent to 50 per cent, or over.

By this is meant that the moisture content of the wheat berry thus is increased. The moistened wheat is held at approximately this moisture level by intermittently adding additional moisture, and the temperature of about 80° F. is maintained for about six to seven days. In this condition of moisture and temperature, germination begins and continues until a desired Lintner value is obtained. This is approximately 200° Lintner, or, approximately 800 milligrams of maltose. This value will vary, depending upon the use of the germinated product.

During germination, respiration takes place causing an increase in the temperature of the wheat being germinated. Therefore, the wheat must be turned frequently by mechanical means, either in bins or in rotary kilns, so as to control the temperature and regulate the moisture content. Moist air is blown through or over the moistened germinating wheat, thereby regulating the temperature of this air that controls the germinating temperature. After this germination process, or procedure, has progressed to the point desired, as determined by Lintner value and diastatic tests, all germination is killed by dehydrating the sprouted wheat. This usually is done in rotary kilns, where the sprouted wheat is fed into one end, rotated over and over through spiral bins, and then discharged at the other end. This kiln usually is higher at the charge end than at the discharge end, gravity facilitating the movement of the germinated wheat through the rotary kiln.

During the germination processes, the wheat forms a sprout, often called the acrospire, and the length of this acrospire determines the desired germination. This acrospire usually attains a length of about three-quarters the length of the wheat berry. Very small roots also are formed during the germination process, these emanating from the germ in the wheat, from which also comes the acrospire. Warm dry air at a temperature of about 120° F. now is introduced at the discharge end of the kiln. This warm air dehydrates the germinated wheat, reducing its moisture content down to about eight per cent.

During this dehydration process, the sprouts, or acrospires, are broken off and shriveled up, and likewise the small roots. These broken off acrospires and roots are separated from the germinated wheat by screening or air separation, from the germinated wheat. In the final dehydration process, the temperature is increased to about 150° F. for a short period, so as to reduce the moisture content of the germinated wheat down to six per cent, or under. This finally dehydrated and germinated wheat then is cooled down to a temperature of about 80° F. and milled into flour or similar product used in the making of regular bread or pastry flours. In this milling operation the undesirable celluloses are removed so that the finished product resembles a straight or ninety per cent extraction of bread-making flour. In the baking industry, this final product is used to fortify practically all of the bread-making flours to raise their diastatic and proteolytic factors.

It will be understood that the above description of the regularly-used processes may vary considerably from one brand of flour to another, but all of these varying procedures arrive at substantially the same kind of product.

In accordance with the present invention, the wheat is germinated using the same temperature and moisture conditions as described above, but the germination is allowed to proceed for from three to seven days longer than normally used in the making of these regular malted wheat flours now used so extensively in the making of bread flours. In this longer germinating and respiration period more of the proteins are converted into water-soluble albumoses, peptones, and various amides. Also, more of the carbohydrates, or starches of the wheat berry, are converted into dextrins and sugars. Besides these changes, there are many other somewhat yet undetermined end products of germination that produce great benefits to the subsequent baking characteristics of this product. With this longer period of germination, the Lintner value is raised to around 300° to 400°, depending upon the grain and its response to germination, approximately 350° Lintner being a fair average.

It is quite apparent that many changes also take place in the pentoses or pentosanes of the wheat berry. Also, many changes must take place in the mineral salt balance, such as phytin, lipoids, and lipids, which normally occur in all wheats. After germination has proceeded from ten to fifteen days, the optimum average being about twelve days, the sprouted wheat is kilned in the manner now employed in the art, except that the dehydrating temperature is much higher. This temperature must be high enough to completely kill or inactivate the proteolytic, diastatic, and all other living and active enzymes. The temperature varies in practice from about 175° F. up to about 200° F., the average being about 185° F., the temperature during the dehydration varying somewhat with the length of time the germinating wheat has been held. The higher temperature and the presence of moisture during the dehydration process completely inactivate all the living and active enzymes which normally occur in regular malted wheat flours. The longer the dehydration time for the germinated wheat, the lower may be the temperature required to completely inactivate and dehydrate it.

The dehydration period is continued for about twice as long as in the making of so-called regular malted wheat flours, and the moisture content is brought down to about six per cent at the completion of the dehydration process. At the end of the dehydration process at the higher temperature, the acrospires and rootlets, which are about twice as long as are formed in the regular manufacture of malted wheat flour, are removed by selective screening and air separation. The dehydrated and germinated wheat of the present invention must be cooled to bring down the milling temperature of about 80° F.

In grinding the product of the present invention, the mill roll settings must be changed in order to grind the new product obtained from germinating the wheat longer and dehydrating it at a higher temperature, because in the case of the improved product of the present invention, the germinated wheat is more flinty than the usual germinated wheat. As an alternative procedure, the improved product may be obtained also by dehydrating the longer-germinated wheat at a lower temperature, for example, about 150° F., and then milling this product into flour, more or less along the lines of milling the regular malted wheat flours.

In operating in accordance with this latter procedure, the end product still will be highly diastatic and proteolytic, which characteristics are not desirable or wanted in this new product of the present invention. In order to remove the diastatic and proteolytic properties, the end product from the lower dehydration temperatures is heavily chlorinated, after milling, by the use of about eight ounces of liquid chlorine per one hundred pounds of malted wheat flour. The chlorination is effected by agitating the milled product in an atmosphere containing chlorine in the above-indicated concentration, there resulting an oxidation of the flour which completely kills and inactivates all of the living enzymes, such as proteolytic, diastatic, peptase, invertase, maltase, cytase, cellulose, and the like. After chlorination, the product is used in the same way as the product produced by inactivating all of these enzymes through the use of higher temperatures in the dehydration step.

Either of these products is used very advantageously in the baking industry, especially in yeast-mixed products. They contribute much to products in that they can be used in larger quantities than the normal or regular malted wheat flours. The regular malted wheat flours which contain active and living enzymes may possibly be used in excess to the extent that they will produce too much proteolysis and diastasis to be beneficial. In fact, in over-use, these regular malted wheat flours become highly detrimental in that they decompose too much of the proteins and too much of the starch. This is not the case with the malted wheat flour of the present invention in which all of the active enzymes have been inactivated by heat or heavy chlorination.

In bakery practice, usually not over 0.5 per cent of the regular and active enzyme malted wheat flour can be added to a normal bread flour. In fact, on an average, 0.25 per cent is added. To use any higher amount involves, as above explained, the introduction of too much proteolytic and diastatic activity, which causes great harm to the finished baked product.

In the inactivated enzyme malted wheat flour of the present invention, the amount of the product which can be used ranges all the way from 0.5 per cent up to 5 per cent, depending upon the type of material made from the improved product. These percentages are based upon their relation to the normal flour in this product incorporated either at the mill or added in some form at the bakery. Normally from one per cent to one and one-half per cent of the new malted wheat flour of this invention can be added either to the regular flour at the flour mill by physically mixing into the flour, or it may be mixed into a flour base or other edible material, including milk, in various percentages, and sold to bakeries as a concentrated mix.

For instance, this new malted wheat product of the present invention may be incorporated in powdered whole milk, or skim milk, in such a percentage as to contribute enough to produce desirable reaction in the dough. In either form, it will serve its desirable purposes when added to the formula in the bakery. It may be added at the sponge or dough state, or used in straight doughs, wherein all of the ingredients usually are added at one time. Its contribution to desirable baking characteristics are several, namely, for example, more fermentation tolerance, longer and more sustained gas production, more mellow and more machinable doughs, followed by improved taste and flavor; more uniform and greater oven-spring, more uniform volume, better crust color, more bloom, vastly improved grain, texture and crumb qualities such as whiter crumb color, and greatly improved keeping qualities, retaining its moisture content much longer, and remaining soft in the wrapped package much longer than is possible with baked products resulting from the use of the regular malted wheat flours.

All these improved properties are derived through the combination of the changed proteins and starches present in the germinated wheat flours. The proteins are more water-soluble through their conversion to simpler proteins, and the carbohydrates or starches are changed with more readily fermentable substance through their larger conversion into dextrins, maltose, sugars, and the like. As has been pointed out above, there is apparently considerable change also in the mineral salts, the fats, the phytins, and other normally occurring substances in the wheat berry. These changes took place through respiration and germination, and their change has been greatly enlarged and improved in accordance with the present invention by carrying the germination far beyond that normally done in the manufacture of regular malted wheat flours.

Regular malted wheat flours are used largely for their contribution of diastatic and proteolytic enzymes, and undoubtedly some of the other living and active enzymes contribute some value also. In the case of the present improved product, there is no reliance in any way upon any active or living enzymes, since such have been completely killed by the process of the present invention. Several improvements resulting from the improved product of the present invention remain as yet unexplained, but such improvements are obtained regularly in practice.

During the prolonged germination period employed in the present invention, about twenty per cent of the original weight of the wheat is lost through respiration and to the sprouts and to the rootlets formed during the germination period. The ever-present oxidation and reduction system occurring during germination have changed materially the complex substances present in the wheat berry so that the end product is very beneficial when added in amounts recommended to regular wheat flours.

Important features of the improved process of the present invention resulting in the improved product described above, are the longer germination period and the complete killing or inactivation of the living and active enzymes normally occurring in malted wheat flours, resulting in the ability to use higher amounts of the new product of this invention in order to produce optimum results. This new and novel product is used in addition to and independent of regular malted wheat flours, and has no bearing or connection with the malting of bakery flours at the mill, as now customarily done; and the use of the improved product does not interfere with this accustomed practice. The value of the present improved product is based upon contributing and increasing enzymatic action to normally milled bakery flours. It is found in practice that wheat malts and barley malts, in dry or liquid form, are very desirable and beneficial to use along with this improved malted wheat product of the present invention.

Deviations from the normal procedure in the moistening or steeping process for the germination have produced some very unexpected results which are indicated as follows: small amounts of water-soluble mineral salts such as sodium or potassium acid phosphates, ammonium chloride, ammonium sulphate, magnesium chloride, magnesium sulphate, sodium or potassium nitrate, sodium or potassium chloride, di-sodium or di-potassium phosphates are added to the steep water. The total amount of these salts added to the steep water will not exceed 500 parts per million parts of water. Disaccharides or mono-saccharides, such as sucrose or dextrose, when added at the rate of not over 300 parts per million parts of water, produce beneficial results. Concentrated water-soluble malt diastase, dissolved in the steep water at the rate of not over 500 parts per million parts of water, exerts considerable action. Many other water-soluble nutriments or growth-promotive materials may be added beneficially to the steep water. All of these substances, when added to the steep water, accelerate and guide the respiration and germination and assist in the conversion of the complex materials in the wheat berry into a more water-soluble and simpler end product. These end products become more highly beneficial in yeast fermentation when the resulting malt flour of the present invention is added in suitable amounts, for example, from about one per cent to about two per cent to the regular baking flour.

While the action of such nutriments or growth-producing substances is not understood, it is demonstrated that though they exist in very small quantities, they have great influence on improving yeast action in the dough. It is optional to use these materials in the steep water, since an excellent product can be obtained without them.

The process herein described is applicable to barley as well as to wheat, and the barley grain produces a comparable product to that produced from wheat. Consequently, it will be understood that the term "grain" employed in the appended claims is intended to be generic to both wheat and barley.

As previously indicated, the flour made by my process is a super-malted, devitalized material in which there is no trace of latent proteolytic or enzymic activity. Other ways of killing the malted grain than those specifically mentioned, as by ultra-high frequency radiation or possibly electrolysis, may be used.

Specifically, when the germinated wheat was placed in bags in the dielectric field generated by a 750 watt electric oscillator operating at a frequency of 150 mega-cycles, the grain was completely inactivated in from 3 to 7 minutes, the time varying with the mass of the grain subjected to treatment.

Commercially the inactivated super-malted flour of the present invention is best distributed and used by incorporating it with dried milk powder in a percentage such that when the baker uses a regular formula requiring dried milk, the proper quantity of the super-malted flour will be mixed with the milk, thus eliminating any need for the baker to change his formula. When the super-malted flour is mixed with dried milk, it is also more easily and uniformly distributed through the mix.

It will be understood from the foregoing description that the process of the present invention is not limited to the preferred embodiment of the invention described above; but that the process of the present invention embraces within its scope such modifications and changes as may be necessary to adapt the invention to various conditions and uses, as defined by the appended claims.

I claim:

1. A process of making a food for stimulating and promoting yeast fermentation in dough of yeast-raised food products comprising sprouting natural wheat at a temperature of approximately 80° F. in the presence of steep moisture to raise the moisture content of the grain to fifty per cent or higher for a period of ten to fifteen days to malt the grain to a Lintner value ranging between 300° and 400° and to reduce the weight of the grain approximately twenty per cent while substantially modifying the protein and starch contents of the grain, dehydrating the malted grain by heating to a temperature substantially above 120° F. about 150° F., milling the dehydrated grain to flour, and treating the milled product with liquid chlorine in sufficient quantity to completely destroy the proteolytic and diastatic enzymes therein.

2. A process of making a food for stimulating and promoting yeast fermentation in dough of yeast-raised food products comprising sprouting natural wheat at a temperature of approximately 80° F. in the presence of a steep moisture to raise the moisture content to fifty per cent or higher for a period of ten to fifteen days to malt the grain to a Lintner value ranging between 300° and 400° and to modify the protein and starch contents of the grain, slowly dehydrating the malted grain at a temperature of 175° to 200° F. for a sufficient period to reduce the moisture content of the wheat to approximately 6% to completely destroy the proteolytic and diastatic enzymes in the grain, and milling the dehydrated malted grain to flour.

3. A process of making a food for stimulating and promoting yeast fermentation in dough of yeast-raised food products comprising sprouting natural wheat at a temperature of approximately 80° F. in a steep moisture to raise the moisture content of the grain to fifty per cent or higher for a period of ten to fifteen days to malt the grain to a Lintner value ranging between 300° and 400° and to modify the protein and starch contents of the grain, dehydrating the malted grain at a temperature of 120° to 150° F. for a sufficient period of time to reduce the moisture content of the wheat to approximately 6%, milling the dehydrated grain to flour, and chlorinating the flour to destroy the proteolytic and diastatic enzyme contents.

4. A process of making a food for stimulating and promoting a yeast fermentation in dough of yeast-raised food products comprising sprouting natural wheat at a temperature of approximately 80° in the presence of steep moisture to raise the moisture content of the grain to fifty per cent or higher for a period of ten to fifteen days to malt the grain to a Lintner value ranging between 300° and 400°, slowly dehydrating the malted grain at a temperature in the range of 120° to 150° F. for a sufficient period of time to reduce the moisture content of the wheat to approximately 6%, milling the dehydrated grain to flour, and subjecting the flour to ultra-high electric frequency radiation to destroy the proteolytic and diastatic enzymes therein.

5. The process defined in claim 2, in which the sprouting grain forms acrospires and rootlets, the average length of the acrospires being about 1½ times the length of the grain berry, said acrospires and rootlets being shriveled in the dehydration step, and screening the dehydrated grain to separate the rootlets and acrospires prior to milling the grain into flour.

6. The process defined in claim 1 in which the grain is malted in the presence of a steep moisture containing a minor portion of growth-promoting mineral salts of the class consisting of mono and disodium and potassium phosphates and acid phosphates and sodium, potassium and ammonium phosphates, nitrates and chlorides.

7. The process defined in claim 1 in which the grain is malted in the presence of steep moisture containing a minor portion of growth-promoting saccharide of the group consisting of dextrose and suchrose.

8. A yeast food to stimulate and promote yeast fermentation in dough of yeast-raised food products consisting of a milled flour made from approximately 80% of the wheat berry which has been germinated and has about 6% by weight of moisture content with that percentage of the protein of the wheat converted into water-soluble albumoses, peptones and amides and that percentage of the starch of the wheat converted to dextrines and sugars resulting from the germination of the wheat berry to a Lintner value of 300° to 400°, which consumes approximately 20% of the wheat berry to form sprouts and the sprouts are removed, the dehydrated germinated product having the proteolytic and diastatic enzymes therein destroyed.

9. A yeast food for effective dissemination in the ingredients for making dough for yeast-raised food products consisting of the yeast food defined in claim 8 fully distributed in a quantity larger than its weight of powdered dry milk.

10. The yeast food product defined in claim 9 in which the powdered milk is a powdered dry skim milk.

References Cited in the file of this patent

UNITED STATES PATENTS

| Number | Name | Date |
|---|---|---|
| 500,305 | Tilders | June 27, 1892 |
| 579,739 | Clowes | Mar. 30, 1897 |
| 743,810 | Berg | Nov. 10, 1903 |
| 1,355,128 | Corby | Oct. 12, 1920 |
| 1,493,685 | Lindsey | May 13, 1924 |
| 2,275,836 | Briess | Mar. 10, 1942 |
| 2,291,529 | Carbon | July 28, 1942 |

FOREIGN PATENTS

| Number | Country | Date |
|---|---|---|
| 9,329 | Great Britain | of 1902 |
| 7,955 | Great Britain | of 1904 |
| 5,226 | Great Britain | of 1907 |

OTHER REFERENCES

Kent Jones: Modern Cereal Chemistry, 3 ed., 1939, Northern Publishing Company, Liverpool, page 216.

Sumner et al.: Enzymes, 1943, Academic Press, Inc., Pub., N. Y.